(12) United States Patent
Zhang et al.

(10) Patent No.: US 11,775,812 B2
(45) Date of Patent: Oct. 3, 2023

(54) MULTI-TASK BASED LIFELONG LEARNING

(71) Applicant: Samsung Electronics Co., Ltd., Suwon-si (KR)

(72) Inventors: Jie Zhang, San Jose, CA (US); Junting Zhang, Los Angeles, CA (US); Shalini Ghosh, Menlo Park, CA (US); Dawei Li, San Jose, CA (US); Jingwen Zhu, Santa Clara, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 820 days.

(21) Appl. No.: 16/379,704

(22) Filed: Apr. 9, 2019

(65) Prior Publication Data

US 2020/0175362 A1  Jun. 4, 2020

Related U.S. Application Data

(60) Provisional application No. 62/792,052, filed on Jan. 14, 2019, provisional application No. 62/774,043, filed on Nov. 30, 2018.

(51) Int. Cl.
*G06N 3/08* (2023.01)
*G06N 3/04* (2023.01)

(52) U.S. Cl.
CPC .......... *G06N 3/08* (2013.01); *G06N 3/04* (2013.01)

(58) Field of Classification Search
CPC .......... G06N 3/08; G06N 3/04; G06N 3/0454; G06N 3/082; G06N 3/0445
See application file for complete search history.

(56) References Cited

U.S. PATENT DOCUMENTS

| 10,055,685 | B1  |   | 8/2018 | Arel et al. |
| 11,348,032 | B1  | * | 5/2022 | Van Gael ................ G06F 8/31 |
| 2010/0010943 | A1 |   | 1/2010 | Ito et al. |
| 2017/0083829 | A1 |   | 3/2017 | Kang et al. |

(Continued)

FOREIGN PATENT DOCUMENTS

| CN | 106845549 | * | 6/2017 | ............... G06K 9/66 |
| CN | 108197707 | * | 6/2018 | ........... G06N 3/0481 |

(Continued)

OTHER PUBLICATIONS

Kokkinos, I. (2017). Ubernet: Training a universal convolutional neural network for low-, mid-, and high-level vision using diverse datasets and limited memory. In Proceedings of the IEEE conference on computer vision and pattern recognition (pp. 6129-6138). (Year: 2017).*

(Continued)

*Primary Examiner* — Alan Chen

(57) ABSTRACT

Methods, devices, and computer-readable media for multi-task based lifelong learning. A method for lifelong learning includes identifying a new task for a machine learning model to perform. The machine learning model trained to perform an existing task. The method includes adaptively training a network architecture of the machine learning model to generate an adapted machine learning model based on incorporating inherent correlations between the new task and the existing task. The method further includes using the adapted machine learning model to perform both the existing task and the new task.

20 Claims, 6 Drawing Sheets

(56) References Cited

U.S. PATENT DOCUMENTS

| | | | | |
|---|---|---|---|---|
| 2017/0262737 | A1* | 9/2017 | Rabinovich | G06K 9/6267 |
| 2018/0204110 | A1 | 7/2018 | Kim et al. | |
| 2018/0260695 | A1 | 9/2018 | Majumdar et al. | |
| 2018/0357539 | A1* | 12/2018 | Hwang | G06N 3/04 |
| 2018/0373953 | A1* | 12/2018 | Tomotaki | G06V 10/776 |
| 2019/0188567 | A1* | 6/2019 | Yao | G06N 3/082 |
| 2020/0042877 | A1* | 2/2020 | Whatmough | G06N 3/082 |

FOREIGN PATENT DOCUMENTS

| | | |
|---|---|---|
| JP | 2018005739 A | 1/2018 |
| JP | 2018151876 A | 9/2018 |
| WO | 2017/189859 A1 | 11/2017 |
| WO | 2018081563 A1 | 5/2018 |

OTHER PUBLICATIONS

International Search Report and Written Opinion of the International Searching Authority dated Mar. 4, 2020 in connection with International Patent Application No. PCT/KR2019/015949, 9 pages.

Ruvolo et al., "ELLA: An Efficient Lifelong Learning Algorithm", Proceedings of the 30th International Conference on Machine Learning (ICML'13), Jun. 2013. 9 pages.

He et al., "AMC: AutoML for Model Compression and Acceleration on Mobile Devices", European Conference on Computer Vision (ECCV 2018), Sep. 2018, pp. 815-832.

Wen et al., "Overcoming catastrophic forgetting problem by weight consolidation and long-term memory", May 2018, 9 pages.

Zoph et al., "Neural Architecture Search with Reinforcement Learning", International Conference on Learning Representations (ICLR 2017), Apr. 2017, 16 pages.

Chen et al., "Net2Net: Accelerating Learning Via Knowledge Transfer", International Conference on Learning Representations (ICLR 2016), May 2016, 12 pages.

Cai et al., "Efficient Architecture Search by Network Transformation", The Thirty-Second AAAI Conference on Artificial Intelligence (AAAI-18), Apr. 2018, pp. 2787-2794.

Ashok et al., "N2N learning: Network to Network Compression via Policy Gradient Reinforcement Learning", International Conference on Learning Representations (ICLR 2018), May 2018, 21 pages.

Schwarz et al., "Progress & Compress: A scalable framework for continual learning", Proceedings of the 35th International Conference on Machine Learning (ICML 2018), Jul. 2018, 13 pages.

Zhang et al., "Dynamically Hierarchy Revolution: DirNet for Compressing Recurrent Neural Network on Mobile Devices", 2018 International Joint Conference on Artificial Intelligence, Jul. 2018, 8 pages.

Yoon et al., "Lifelong Learning with Dynamically Expandable Networks", International Conference on Learning Representations (ICLR 2018), May 2018, 11 pages.

Extended European Search Report in connection with counterpart European Patent Application No. 19889404.0 dated May 23, 2022, 12 pages.

Rosenfeld et al., "Incremetal Learning Through Deep Adaptation", Department of Electrical Engineering and Computer Science, York University, Feb. 2018, 13 pages.

Zhang et al., "Regularize, Expand and Compress: Multi-task based Lifelong Learning via NonExpansive AutoML", https://arxiv.org/pdf/1705.04288.pdf, Mar. 2019, 9 pages.

* cited by examiner

MULTI-TASK BASED LIFELONG LEARNING

CROSS-REFERENCE TO RELATED APPLICATION AND CLAIM OF PRIORITY

This application claims the benefit under 35 U.S.C. § 119(e) of U.S. Provisional Patent Application No. 62/774,043 filed on Nov. 30, 2018 and U.S. Provisional Patent Application No. 62/792,052 filed on Jan. 14, 2019. The above-identified provisional patent application is hereby incorporated by reference in its entirety.

TECHNICAL FIELD

The present disclosure relates generally to incremental lifelong learning for machine learning (ML). More specifically, the present disclosure relates to multi-task based lifelong learning.

BACKGROUND

Lifelong learning, the problem of continual learning where tasks arrive in sequence, has been lately attracting more attention in computer vision and artificial intelligence research. The aim of lifelong learning is to develop a system that can learn new tasks while maintaining the performance on the previously learned tasks. However, there are two obstacles for lifelong learning of deep neural networks: catastrophic forgetting and capacity limitation.

In many real-world applications, batches of data arrive periodically (e.g., daily, weekly, or monthly) with the data distribution changing over time. This presents an opportunity (or demand) for lifelong learning or continual learning and is an important issue in improving artificial intelligence. The primary goal of lifelong learning is to learn consecutive tasks without forgetting the knowledge learned from previously trained tasks and leverage the previous knowledge to obtain better performance or faster convergence on the newly coming task. One simple way is to finetune the model for every new task. However, such retraining typically degenerates the model performance on both new tasks and the old ones. If the new tasks are largely different from the old ones, it might not be possible to learn the optimal model for the new tasks. Meanwhile, the retrained representations may adversely affect the old tasks, causing them to drift from their optimal solution. This can cause "catastrophic forgetting"—a phenomenon where training a model to perform new tasks interferes the previously learned old knowledge. This leads to a performance degradation or even overwriting of the old knowledge by the new knowledge. Another issue for lifelong learning is resource consumption. A model that is continually trained may increase dramatically in terms of consumed resources (e.g., model size), which may be disadvantageous in applications where resources are limited, for example, in mobile device or mobile computing applications.

SUMMARY

The present disclosure provides for multi-task based lifelong learning.

In one embodiment, a method for lifelong learning is provided. The method includes identifying a new task for a ML model to perform. The ML model trained to perform an existing task. The method includes adaptively training a network architecture of the machine learning model to generate an adapted machine learning model based on incorporating inherent correlations between the new task and the existing task. The method further includes using the adapted ML model to perform both the existing task and the new task.

In another embodiment, an electronic device for lifelong learning is provided. The electronic device includes a memory configured to store a ML model trained to perform an existing task and a processor operably connected to the memory. The processor is configured to identify a new task for the ML model to perform and adaptively training a network architecture of the machine learning model to generate an adapted machine learning model based on incorporating inherent correlations between the new task and the existing task. The processor is further configured to use the adapted ML model to perform both the existing task and the new task.

In yet another embodiment, a non-transitory, computer-readable medium comprising program code for lifelong learning is provided. The program code, when executed by a processor of an electronic device, causes the electronic device to identify a new task for a ML model to perform. The ML model is trained to perform an existing task. The program code, when executed by the processor of the electronic device, causes the electronic device to adaptively training a network architecture of the machine learning model to generate an adapted machine learning model based on incorporating inherent correlations between the new task and the existing task. The program code, when executed by the processor of the electronic device, causes the electronic device to use the adapted ML model to perform both the existing task and the new task.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
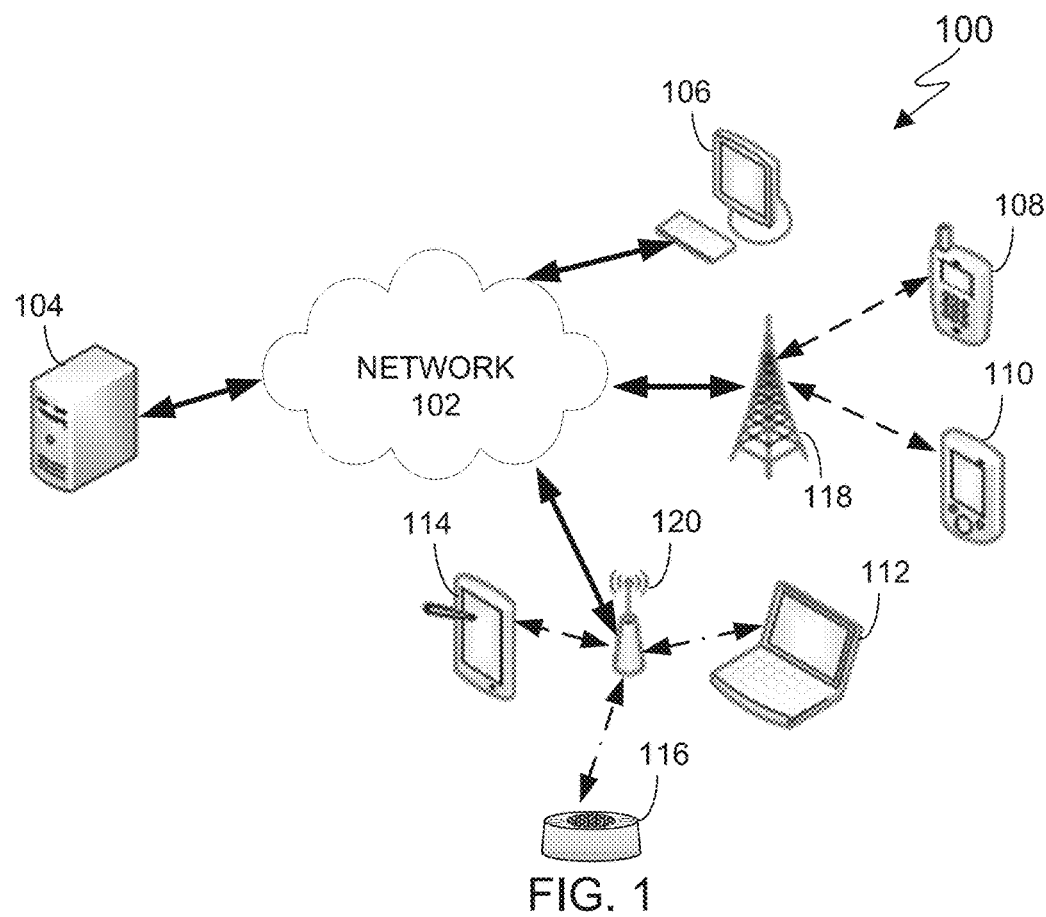
FIG. 1 illustrates an example computing system in which various embodiments of the present disclosure may be implemented.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Embodiments of the present disclosure recognize that there are two primary obstacles for lifelong learning of deep neural networks: catastrophic forgetting and capacity limitations. Accordingly, various embodiments of the present disclosure provide for multi-task based lifelong learning framework, with some embodiments involving non-expansive automatic ML (AutoML). In some embodiments, this framework is referred to as a regularize, expand and compress (REC) framework. In these embodiments, the REC framework includes at least one of the three stages: 1) allowing the ML model to continually learn new tasks without access to the learned tasks' data via multi-task weight consolidation (MWC), 2) expanding the neural network architecture for the ML model to learn the new tasks with improved model capability and performance by network-transformation based AutoML, and 3) compressing the expanded ML model after learning the new tasks to maintain model size, efficiency, and performance. In this disclosure, the terms of "neural network" and "network" are used interchangeably.

Some embodiments of the present disclosure automatically expand the neural network architecture for lifelong learning, with higher performance and less parameter redundancy than other network architectures. To better facilitate both automatic knowledge transfer without human expert tuning and model design with optimized model complexity, some embodiments apply AutoML for lifelong learning while taking learning efficiency into consideration.

As used herein, AutoML is automatically learning a suitable ML model for a given task. Neural architecture search (NAS) is a subfield of AutoML for deep learning, which searches for optimal hyperparameters of a neural network architecture using a reinforcement learning framework. Neural network architecture defines how different ML algorithms in the ML model work together and process inputs, perform tasks, and provide results. Reinforcement learning framework involves observing a network's performance on a validation set as a reward signal, and giving higher probabilities to network architectures that have higher performances than network architectures that have lower performances to adapt the network model. Embodiments of the present disclosure recognize that using a reinforcement learning framework directly in the lifelong learning setting would result in forgetting the model's knowledge of old tasks and may be wasteful because each new task network architecture would need to be searched from scratch, which ignores correlations between previously learned tasks and the new task.

Various embodiments of the present disclosure provide an efficient AutoML algorithm for lifelong learning. In some embodiments, this efficient AutoML algorithm is referred to as a Regularize, Expand and Compress (REC). In these embodiments, REC involves first searching a best new neural network architecture for the given tasks in a continuous learning mode. Tasks may include image classification, image segmentation, object detection and/or many other computer vision tasks. The best neural network architecture can solve multiple different tasks simultaneously, without catastrophic forgetting of old tasks' information, even when there is no access to old tasks' training data. Next, in these embodiments, REC involves exploring the network architecture via AutoML. For example, this may involve using a net2net transformation based AutoML to reduce the search space and the training time of the new neural network architecture. REC is an efficient lifelong learning algorithm, which offers accurate task performance on mobile devices without or with little memory increase after learning different new tasks.

Various embodiments of the present disclosure are implemented by or within part or all of a computing system. FIG. 1 illustrates an example computing system 100 in which various embodiments of the present disclosure may be implemented. The embodiment of the system 100 shown in FIG. 1 is for illustration only. Other embodiments of the system 100 can be used without departing from the scope of the present disclosure.

In this illustrative example, the computing system 100 is a system in which the lifelong learning techniques of the present disclosure may be implemented. The system 100 includes network 102 that facilitates communication between various components in the system 100. For example, network 102 can communicate Internet Protocol (IP) packets, frame relay frames, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between a server 104 and various client devices 106-116. The client devices 106-116 may be, for example, a smartphone, a tablet computer, a laptop, a digital assistant device, a voice-controlled speaker, a television, a personal computer, a wearable device, smart watch, a head-mounted display (HMD), etc. The server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102. As described in more detail below, in various embodiments, the server 104 may train models for multi-task based lifelong learning. In other embodiments, the server 104 may be a webserver to provide or access deep-learning neural networks, training data, and/or any other information to implement multi-task based lifelong learning embodiments of the present disclosure.

Each client device 106-116 represents any suitable computing or processing device that interacts with at least one server or other computing device(s) over the network 102. In this example, the client devices 106-116 include a desktop computer 106, a mobile telephone or mobile device 108 (such as a smartphone), a personal digital assistant (PDA) 110, a laptop computer 112, a tablet computer 114, and a digital assistant device 116. However, any other or additional client devices could be used in the system 100. As described in more detail below, each client device 106-116 may train models for multi-task based lifelong learning.

In this example, some client devices 108-116 communicate indirectly with the network 102. For example, the client devices 108 and 110 (mobile devices 108 and PDA 110, respectively) communicate via one or more base stations 118, such as cellular base stations or eNodeBs (eNBs). Mobile device 108 includes smartphones. Also, the client devices 112, 114, and 116 (laptop computer, tablet computer, and digital assistant device, respectively) communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s).

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of the present disclosure to any particular configuration. While FIG. 1 illustrates one operational environment in which various features disclosed in this patent document can be used, these features could be used in any other suitable system.

Figure 2:
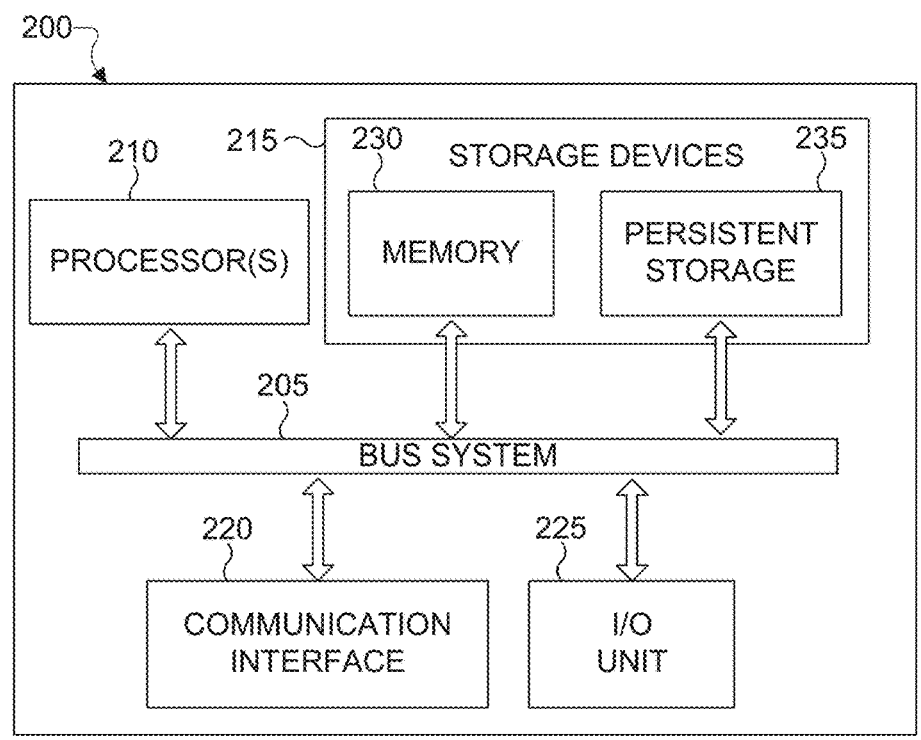
FIGS. 2 and 3 illustrate example devices in a computing system in accordance with various embodiments of the present disclosure.
Figure 3:
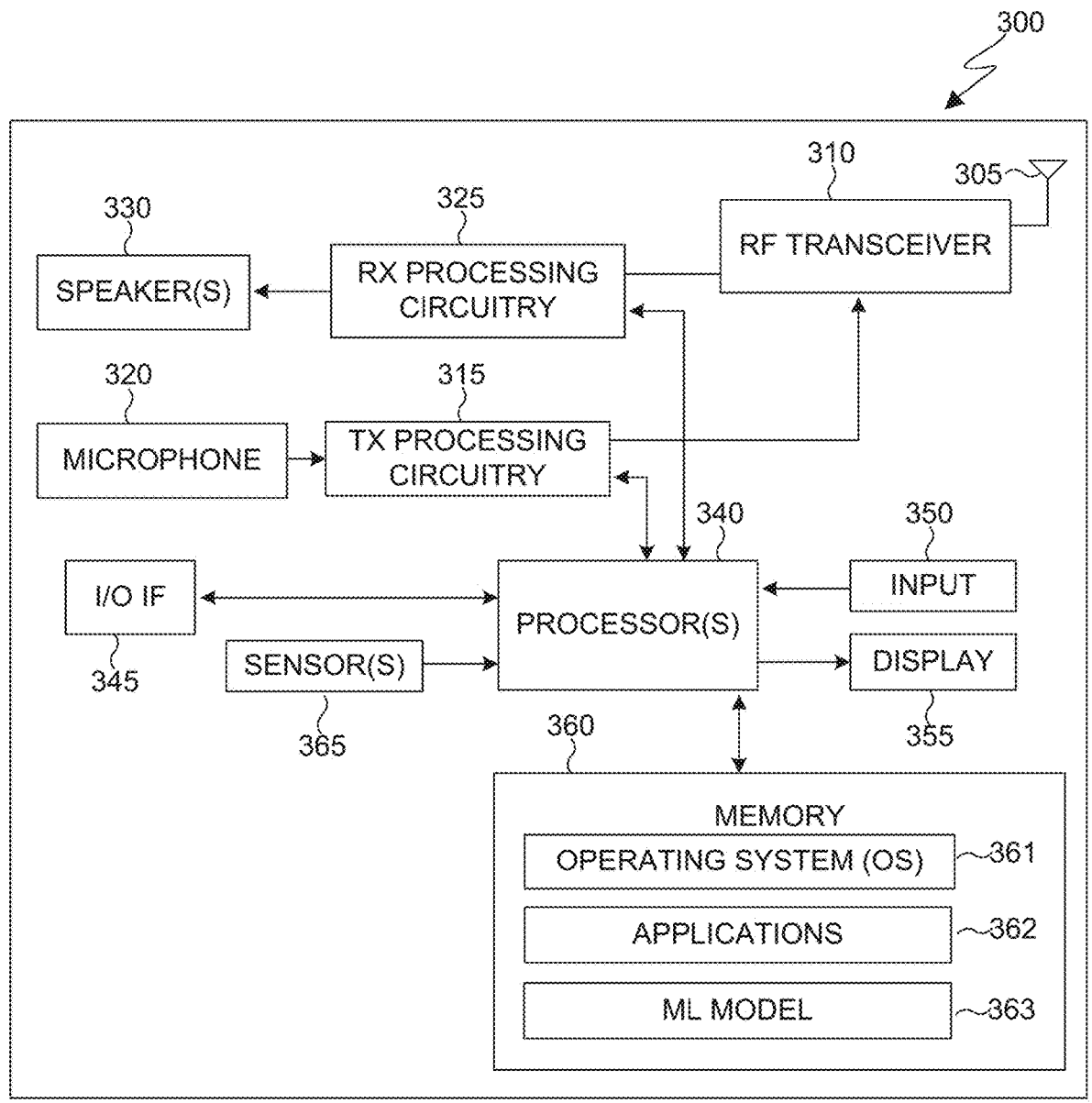

FIGS. 2 and 3 illustrate example devices in a computing system in accordance with various embodiments of the present disclosure. In particular, FIG. 2 illustrates an example electronic device 200, and FIG. 3 illustrates an example electronic device 300. The electronic device 200 could represent the server 104 of FIG. 1, and the electronic device 300 could represent one or more of the client devices 106-116 of FIG. 1. The embodiments of the electronic devices 200 and 300 shown in FIGS. 2 and 3 are for illustration only, and other embodiments could be used without departing from the scope of the present disclosure. The electronic devices 200 and 300 can come in a wide variety of configurations, and FIGS. 2 or 3 do not limit the scope of the present disclosure to any particular implementation of an electronic device.

Electronic device 200 can represent one or more servers or one or more personal computing devices. As shown in FIG. 2, the electronic device 200 includes a bus system 205 that supports communication between at least one processor(s) 210, at least one storage device(s) 215, at least one communications interface 220, and at least one input/output (I/O) unit 225.

The processor 210 executes instructions that can be stored in a memory 230. The instructions stored in memory 230 can include ML model(s) for performing tasks instructions, neural network architectures for ML algorithms of such ML models, and algorithms to implement a framework for multi-task based lifelong learning. The processor 210 can include any suitable number(s) and type(s) of processors or other devices in any suitable arrangement. Example types of processor(s) 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). The persistent storage 235 can contain one or more components or devices supporting longer-term storage of data, such as a ready-only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). The I/O unit 225 allows for input and output of data. For example, the I/O unit 225 can provide a connection for user input through a keyboard, mouse, keypad, touchscreen, motion sensors, or any other suitable input device. The I/O unit 225 can also send output to a display, printer, or any other suitable output device.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

The electronic device 300 can be any personal computing device, such as, for example, a wireless terminal, a desktop computer (similar to desktop computer 106 of FIG. 1), a mobile device (similar to mobile device 108 of FIG. 1), a PDA (similar to PDA 110 of FIG. 1), a laptop (similar to laptop computer 112 of FIG. 1), a tablet (similar to tablet computer 114 of FIG. 1), a digital assistant device (similar to digital assistant device 116 of FIG. 1), a smart television, a wearable device, smartwatch, and the like.

As shown in FIG. 3, the electronic device 300 includes an antenna 305, a radio-frequency (RF) transceiver 310, a transmit (TX) processing circuitry 315, a microphone 320, and a receive (RX) processing circuitry 325. The electronic device 300 also includes a speaker 330, a one or more processors 340, an input/output (I/O) interface (IF) 345, an input 350, a display 355, and a memory 360. The memory 360 includes an operating system (OS) 361, one or more applications 362, and ML model(s) 363.

The RF transceiver 310 receives, from the antenna 305, an incoming RF signal transmitted by another component on a system. For example, the RF transceiver 310 receives RF signal transmitted by a BLUETOOTH or WI-FI signal from an access point (such as a base station, WI-FI router, BLUETOOTH device) of the network 102 (such as a WI-FI, BLUETOOTH, cellular, 5G, LTE, LTE-A, WiMAX, or any other type of wireless network). The received signal is processed by the RX processing circuitry 325. The RX processing circuitry 325 may transmit the processed signal to the speaker 330 (such as for voice data) or to the processor 340 for further processing (such as for web browsing data). The TX processing circuitry 315 receives voice data from the microphone 320 or other outgoing data from the processor 340. The outgoing data can include web data, e-mail, or interactive video game data. The TX processing circuitry 315 processes the outgoing data to generate a processed signal. The RF transceiver 310 receives the outgoing processed signal from the TX processing circuitry 315 and converts the received signal to an RF signal that is transmitted via the antenna 305.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other applications 362 resident in the memory 360, such as for multi-task based lifelong learning. The processor 340 can move data into or out of the memory 360 as required by an executing process. In some embodiments, the processor 340 is configured to execute the plurality of applications 362 based on the OS 361 or in response to signals received from eNBs (similar to the base stations 118 of FIG. 1) or an operator. The processor 340 is also coupled to the I/O IF 345 that provides the electronic device 300 with the ability to connect to other devices, such as client devices 106-116. The I/O IF 345 is the communication path between these accessories and the processor 340.

The processor 340 is also coupled to the input 350. The operator of the electronic device 300 can use the input 350 to enter data or inputs into the electronic device 300. Input 350 can be a keyboard, touch screen, mouse, track-ball, voice input, or any other device capable of acting as a user interface to allow a user in interact with electronic device 300. For example, the input 350 can include voice recognition processing thereby allowing a user to input a voice command via microphone 320. For another example, the input 350 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme.

The processor 340 is also coupled to the display 355. The display 355 can be a liquid crystal display (LCD), light-emitting diode (LED) display, organic LED (OLED), active matrix OLED (AMOLED), or other display capable of rendering text and/or graphics, such as from websites, videos, games, images, and the like.

The memory 360 is coupled to the processor 340. Part of the memory 360 could include a random-access memory (RAM), and another part of the memory 360 could include a Flash memory or other read-only memory (ROM). The memory 360 can include persistent storage that represents any structure(s) capable of storing and facilitating retrieval of information (such as data, program code, and/or other suitable information on a temporary or permanent basis). The memory 360 can contain one or more components or devices supporting longer-term storage of data, such as a ready only memory, hard drive, Flash memory, or optical disc. In various embodiments, the electronic device 300 includes the ML model 363 to perform ML tasks. This NIL model 363 can be adapted using one or more of the techniques for multi-task based lifelong learning disclosed herein. For example, the electronic device 300 may implement a framework for multi-task based lifelong learning to efficiently adapt the ML model 363 to perform new tasks while maintaining performance on old tasks and model size.

Electronic device 300 can further include one or more sensors 365 that meter a physical quantity or detect an activation state of the electronic device 300 and convert metered or detected information into an electrical signal. For example, sensor(s) 365 may include one or more buttons for touch input, one or more cameras, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an infrared (IR) sensor, an ultrasound sensor, a fingerprint sensor, and the like. The sensor(s) 365 can further include a control circuit for controlling at least one of the sensors included therein.

For example, in various embodiments, the camera in in the sensor(s) 365 may be used to capture images and/or videos of objects for tasks such as object detection and/or classification for multi-task based lifelong learning. In other embodiments, the microphone 320 may be used to capture voice inputs and/or audio for an audio recognition model which is adapted using multi-task based lifelong learning.

Although FIGS. 2 and 3 illustrate examples of devices in a computing system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit the present disclosure to any particular electronic device or server.

Embodiments of the present disclosure recognize that expanding the network architecture for more and more new tasks may lead to a much larger model size, as compared with an initial model, which leads to inefficiencies including memory requirements, power usage, and processing requirements. Many network-expanding-based lifelong learning algorithms increase the model capability but also decrease the learning efficiency in terms of memory cost and power usage. To address these issues, various embodiments provide for model compression after completing the learning of each new task-compressing the expanded model to the initial model size, while focusing on negligible performance loss on both old and new tasks.

Figure 4:
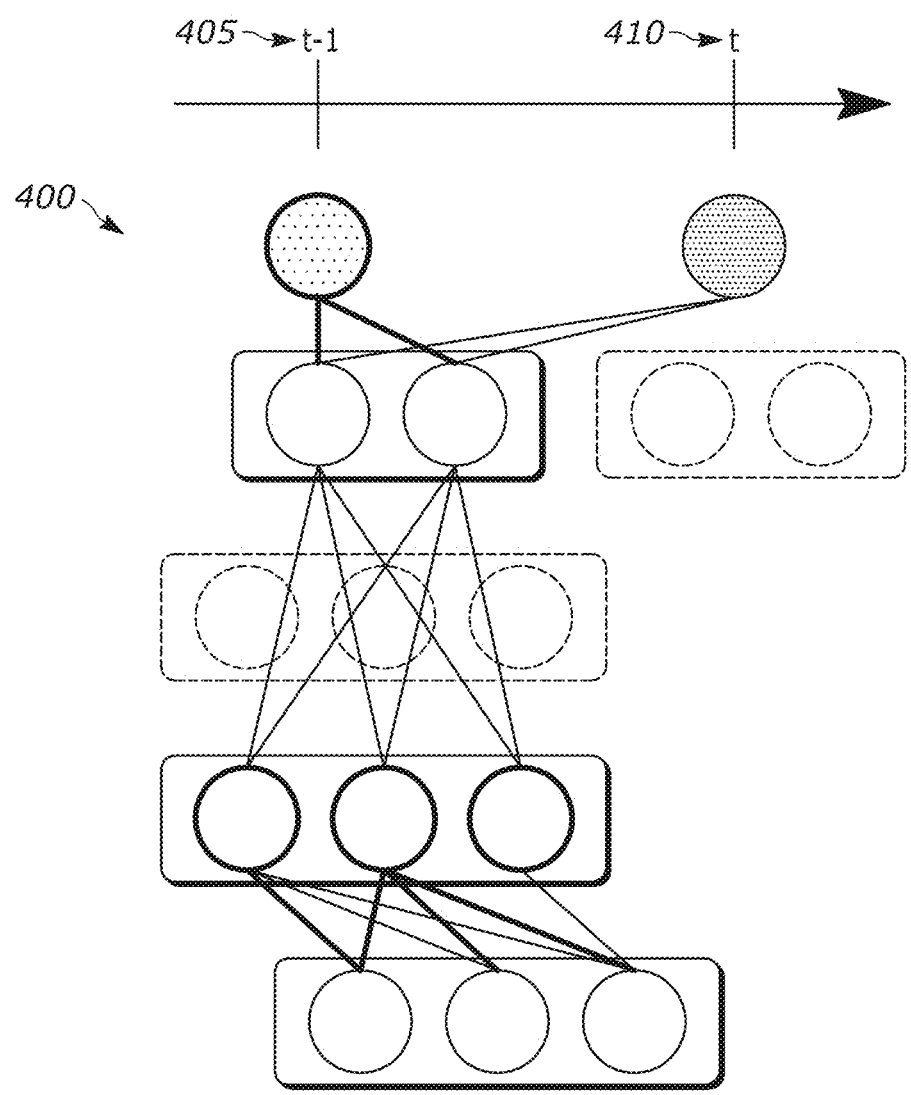
FIG. 4 illustrates a conceptual example of network expansion and compression for multi-task based lifelong learning in accordance with various embodiment of the present disclosure.

FIG. 4 illustrates a conceptual example of network expansion and compression for multi-task based lifelong learning in accordance with various embodiment of the present disclosure. The conceptual example in FIG. 4 is for illustration only. Other embodiments could be used without departing from the scope of the present disclosure.

In this example, network architecture 400 is an illustration of the architecture for a neural network with connections between various ML algorithms as nodes. Network architecture 400 has been trained to perform multiple tasks (i.e., old or existing task(t-1) 405 and new task(t) 410). In this example, the bolded network nodes and lines represent the old or existing network architecture originally in place to perform the old task 405, while the non-bolded nodes and lines represent the expansions to the old or existing network architecture in order to perform the new task 410. As discussed in greater detail below, embodiments of the present disclosure compress the expanded network to increase model efficiency. This compression is illustrated by the dashed network layers and nodes that are removed from the network architecture 400.

In various embodiments, the REC framework of the present disclosure is able to provide for reduced or limited model size from a memory requirement standpoint, can retain old task performance without the original training data for the old tasks, can expand the network capacity to perform new tasks, and provides for AutoML.

Figure 5:
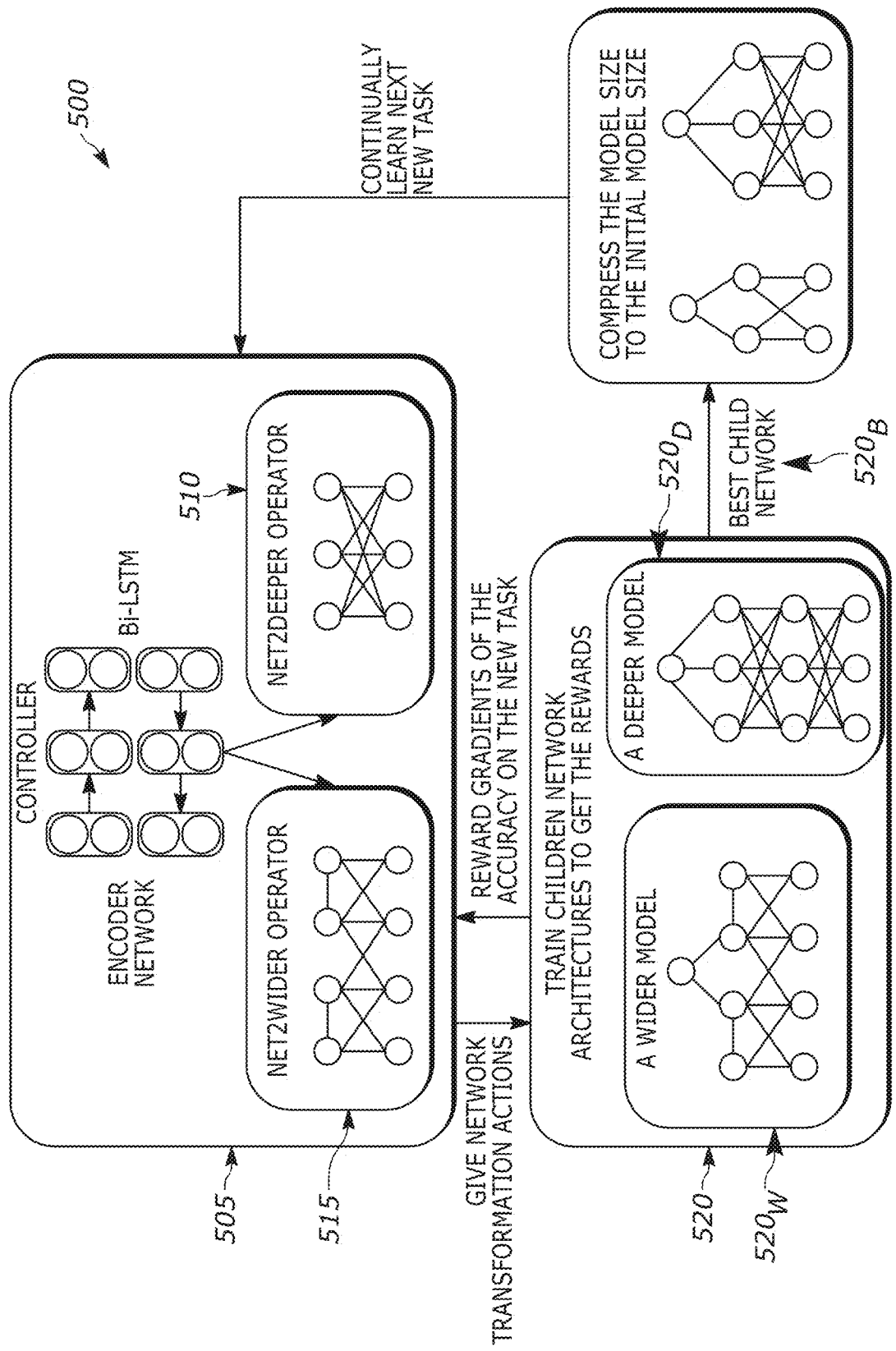
FIG. 5 illustrates an example of a system for multi-task based lifelong learning in accordance with various embodiment of the present disclosure.

FIG. 5 illustrates an example of a system 500 for multi-task based lifelong learning in accordance with various embodiment of the present disclosure. For example, the system 500 may be implemented by either of the electronic device 200 or 300 in FIG. 2 or FIG. 3. The embodiment of the system 500 is for illustration only. Other embodiments could be used without departing from the scope of the present disclosure.

In this illustrative example, system 500 provides an exemplary AutoML framework called REC for lifelong learning. In various embodiments, REC includes three steps: (1) regularize using multi-task weight consolidation (MWC), (2) expand the network architecture using AutoML, and (3) compress the expanded network architecture. The system 500 includes a controller 505 that, upon identifying a new task to be performed, uses deeper and wider operators 510 and 515, respectively, (e.g., such as Net2Deeper and Net2Wider operators) to generate a plurality of child network architectures 520. The deeper operator 510 adds layer(s) to the existing network architecture to perform the new task, while the wider operator 515 widens existing layer(s) of the existing network architecture to perform the new task. The child network architectures 520 are expanded versions of the original/prior/existing network architecture that are generated to perform the new tasks. In these embodiments, the child networks architecture 520 include both wider and deeper child network architectures $520_W$ and $520_D$, respectively, and child network architectures that are combinations thereof.

Thereafter, the system 500 uses MWC and AutoML, as discussed in greater detail below, to search for the best child network architecture $520_B$ for new task, REC using the Net2deeper and Net2wider operators 510 and 515, respectively, in the controller 505 of AutoML. Then, the system 500 compresses the expanded best child network architecture to the same or a similar size as the original/prior/existing network architecture to maintain model size. Thereafter, the system 500 repeats the process for additional new tasks that are identified to provide continual or lifelong learning for multiple tasks.

In one embodiment, the system 500 continually and automatically learns on sequential data sets. With a given small network, the system 500 learns an initial model on a first given task. In this embodiment, using the REC framework, the system 500 then searches for the best network architecture by network transformation based AutoML for the upcoming new tasks without access to the old tasks' data using an MWC algorithm and compresses the expanded network to the initial network's size.

In various embodiments, to overcome catastrophic forgetting for the old tasks, the system 500 uses a novel loss function MWC. Using MWC, the system 500 considers the discriminative weight subset by incorporating inherent correlations between old tasks and new task and learns the newly added or widened layer as a task-specific layer for the new task. In one embodiment, to narrow down the architecture searching space and save training time, network transformation based AutoML is utilized to accelerate the new network searching.

Furthermore, unlike network-expanding-based lifelong learning algorithms, in one embodiment, using REC, the system 500 compresses the model after learning every new task to guarantee the model efficiency. The final model is a space-efficient model, but with an enhanced performance caused by network expansion before the compression. In various embodiments, the system 500 may use knowledge distillation to preserve knowledge of old tasks and compress model size for lifelong learning.

In particular, in various embodiments, the system 500 is able to provide for lifelong learning based on an unknown number of tasks with unknown distributions, being identified sequentially. The system 500 provides a deep-learning model for lifelong learning without catastrophic forgetting. Given a sequence of T tasks, task at time point t=1, 2, . . . , T with $N_t$ images comes with dataset $$D_t = \{x_i^t, y_i^t\}_{i=1}^{N_t}.$$

Specifically, for task t, $y_i^t \in \{1, \ldots, K\}$ is the label for the ith sample $x_i^t \in R^{d_t}$ in task t, where R represents the real number space and $d_t$ is a dimension of R. The training data matric is denoted by $X^t$ for $D_t$, ie., $X^t = (x_1^t, x_2^t, \ldots, x_{N_t}^t)$.

When the dataset of task t is identified, the previous training datasets $D_1, \ldots, D_{t-1}$ may not be available any more, but the deep model parameter $\theta^{t-1} = \{\theta_i^{t-1}\}$ can be obtained. For example, the lifelong learning problem at time point t when given data $D_t$, can be defined as solving:

$$\min_{\theta_t} F(\theta_t | \theta_{t-1}, D_t), t = 1, \ldots, T \quad \text{(Equation 1)}$$

where F is the loss function of solving $\theta^t$, $\theta^t$ is the parameter for task t. That the number of the upcoming tasks can be finite or infinite—for simplification, one embodiment considers the finite scenario.

Embodiments of the present disclosure recognize that ecstatic weight consolidation (EWC), which involves a quadratic penalty on the difference between the parameter $\theta^t$ and $\theta^{t-1}$, may be used to slow down the catastrophic forgetting for previously learned tasks. For example, the posterior distribution ρ is used to describe the problem by the Bayes' rule:

$$\log \rho(\theta^t | D_t) = \log \rho(D_t | \theta^t) + \log \rho(\theta^t | D_{t-1}) - \log \rho(D_t) \quad \text{(Equation 2)}$$

where the posterior probability $\log \rho(\theta^t | D_{t-1})$ embeds the information from task t-1. However, the equation 2 is intractable so that EWC approximates it as a Gaussian distribution with mean of parameter $\hat{\theta}^{t-1}$ and a diagonal I of the fisher information matrix F. The matrix F is computed by $$F_i = I(\theta^t)_{ii} = E_x\left[\left(\frac{\partial}{\partial \theta_i^t}\log\rho(D_t | \theta^t)\right)^2 \bigg| \theta^t\right].$$

Therefore, for example, the problem of EWC on task t can be written as follows:

$$\min_{\theta^t} F_t(\theta^t) + \frac{\lambda}{2}\sum_i F_i(\theta_i^t - \theta_i^{t-1})^2, \quad \text{(Equation 3)}$$

where $F_t$ is the loss function for task t, λ denotes how important the task t-1 is compared to the task t and i labels each weight of the parameter θ.

Embodiments of the present disclosure recognize that one issue with using EWC is that EWC only enforces task t close to task t-1. This will ignore the inherent correlations between task t-1 and task t and such relationship might potentially help overcome catastrophic forgetting on the previously learned tasks.

Accordingly, embodiments of the present disclosure recognize that learning multiple related tasks jointly can improve performance relative to learning each task separately. Redefining equation 3 using multi-task learning (MTL), a new objective function (e.g., equation 4) is provided to improve the ability of overcoming catastrophic forgetting from multiple tasks simultaneously:

$$\min_{\theta^t} \mathcal{F}_t(\theta^t) + \frac{\lambda}{2}\sum_i \mathbb{F}_i(\theta_i^t - \overline{\theta}_i^{t-1})^2 + \lambda_2 \|[\theta^t; \theta^{t-1}]\|_{2,1}, \quad \text{(Equation 4)}$$

where $\lambda_2$ is the non-negative regularization parameter and $\|[\theta^t; \theta^{t-1}]\|_{2,1} = \|\|\theta^t\|_2, \|\theta^{t-1}\|_2\|_1$ is the $l_{2,1}$-norm regularization to learn the related representations. Here, multi-task learning is leveraged by incorporating $l_{2,1}$-norm to capture the common subset of relevant parameters from each layer for task t-1 and task t.

Figure 6:
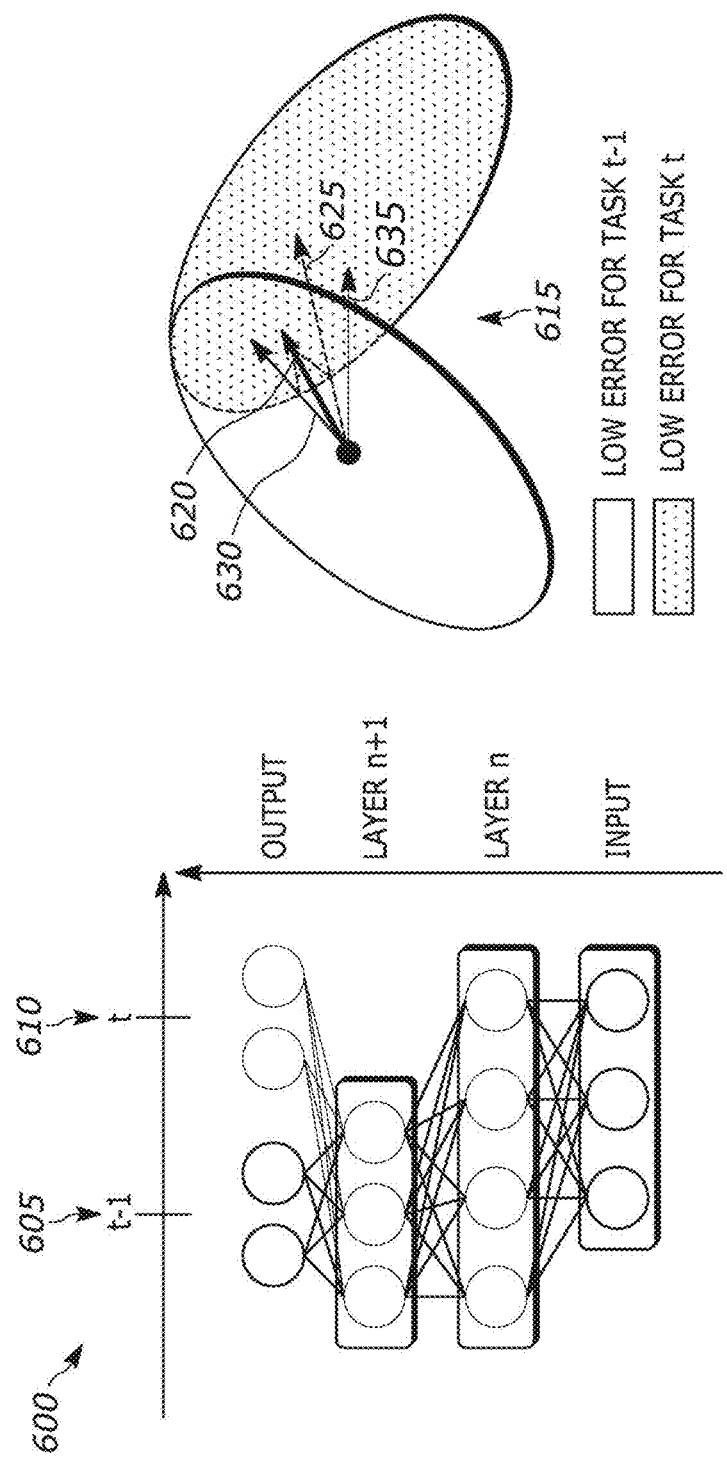
FIG. 6 illustrates a conceptual example of the use of multi-task weight consolidation (MWC) in network expansion and compression for multi-task based lifelong learning in accordance with various embodiment of the present disclosure.

FIG. 6 illustrates a conceptual example of the use of MWC in network expansion and compression for multi-task based lifelong learning in accordance with various embodiment of the present disclosure. The conceptual example in FIG. 6 is for illustration only. Other embodiments could be used without departing from the scope of the present disclosure.

In this example, similarly to network architecture 400 in FIG. 4, network architecture 600 has been expanded and compressed as discussed above to perform multiple tasks (i.e., old or existing task(t-1) 605 and new task(t) 610). In this embodiment, the system 500 uses MWC to retrain the network architecture learned on previous tasks while regularizing the network architecture to prevent forgetting from the original model. In graph 615, line 620 illustrates an MWC approach that learns better parameter representations to overcome catastrophic forgetting by studying MTL with the sparsity-inducing norm (indicated by line 625) and EWC (indicated by line 630). Line 635 indicates a no penalty approach for low error between the existing and new tasks.

In one embodiment, additional parameters are considered that have better representation power corresponding to a subset of tasks. The MTL with sparsity-inducing norm can select discriminative parameter subsets, by incorporating inherent correlations among multiple tasks. To this end, the $l_1$ sparse norm is imposed to learn the new task-specific parameters while learning task relatedness among multiple tasks. Therefore, for example, the objective function for task t becomes:

$$\min_{\theta^t} \mathcal{F}_t(\theta^t) + \frac{\lambda}{2}\sum_i \mathbb{F}_i(\theta_i^t - \overline{\theta}_i^{t-1})^2 + \quad \text{(Equation 5)}$$
$$\lambda_2\|[\theta^t; \theta^{t-1}]\|_{2,1} + \lambda_3\|\theta^t\|_1,$$

where $\lambda_3$ is the non-negative regularization parameter. This algorithm incorporates MWC because it includes the discriminative weight subset by incorporating inherent correlations among multiple tasks.

Various embodiments of the present disclosure provide AutoML for lifelong learning with MWC. MWC is a regularization-based lifelong learning algorithm. In various embodiments, the system 500 uses AutoML with MWC as a loss function to expand the network architecture if the task is very different from the existing task or the network capacity suffers from sparsity. In one embodiment, the system 500 provides AutoML for lifelong learning, in an algorithm (REC) that is summarized in Table 1 below. The details of the network transformations in AutoML for REC are outlined in Table 2.

TABLE 1 summary of REC algorithm.

| | |
|---|---|
| | Input : Dataset Dj. ... , $D_T, \lambda, \lambda_1, \lambda_2$ |
| | Output: $\theta_o^T$ |
| 1 | begin |
| 2 |   for t = 1 → T do |
| 3 |     if t = 1 then |
| 4 |       Train, an initial network with weights $\theta^1$ |
| |         by using Eq. 1. |

TABLE 1-continued summary of REC algorithm.

| | |
|---|---|
| 5 | \| \| else |
| 6 | \| \| \| Search a best child network $\theta^t$ by Alg. 2 |
|   | \| \| \| with Eq. 8. |
| 7 | \| \| \| Compress $\theta^t$ to the same model size as $\theta^1$ |
|   | \| \| \|_ by Eq. 10 and use $\theta_o^t$ for next task. |
|   | \| \|_ |
|   | \|_ |

TABLE 2 network transformations in AutoML for REC.

| | |
|---|---|
|   | Input : Dataset $D_t$, $\theta^{t-1}$ |
|   | Output: The best expended model $\theta^t$ |
| 1 | begin |
| 2 | \| for i = 1 → m do |
| 3 | \| \| for s = 1 → S do |
| 4 | \| \| \| $a_s \leftarrow \pi_{deeper}(g_{s-1}; \theta_{deeper}^{t-1})$ or |
|   | \| \| \| $\pi_{wider}(g_{s-1}; \theta_{wider}^{t-1})$ |
| 5 | \| \| \| $g_s \leftarrow T(g_{s-1}, a_s)$ |
| 6 | \| \| \|_ $\theta^t \leftarrow \theta_{newlayer}^t$ |
| 7 | \| \| $R_i \leftarrow \tanh(A_i^t(gs) \times \pi/2)$ |
| 8 | \| \|_ $\theta_i^t \leftarrow \nabla_{\theta_{i-1}^t} J(\theta_{i-1}^t)$ |
|   | \|_ |

In one embodiment, the system 500 applies wider and deeper operators in the controller 505 as discussed above. In one example, the wider network transformation function is denoted as:

$$\pi_{wider}(j) = \begin{cases} j & j \leq O_l, \\ \text{random sample from } \{1, \ldots O_l\} & j > O_l, \end{cases} \quad \text{(Equation 6)}$$

where $O_l$ represents the outputs of the original layer 1. And the deeper network transformation function is denoted as:

$$\gamma(\pi_{deeper}(j)) = \gamma(j) \forall j. \quad \text{(Equation 7)}$$

where the constraint γ holds for the rectified linear activation. The system 500 learns a meta-controller to generate network transformation actions (Eq. 6 and Eq. 7) when given the initial network architecture. Specifically, in one example, the system 500 uses an encoder network, which is implemented with an input embedding layer and a bidirectional recurrent neural network, to learn a low-dimensional representation of the initial network and be embedded into different operators to generate different network transformation actions. The system 500 may also use a shared sigmoid classifier to make the wider decision according to a hidden state of the layer learned by the bidirectional encoder network and the wider network can be further combined with a deeper operator.

MWC (e.g., as expressed in Eq. 5) is integrated into above AutoML system for lifelong learning. After learning the network $\theta^{t-1}$ on the data $D^{t-1}$, the system 500 automatically searches for the best child network $\theta^t$ by wider and deeper operators when it is necessary to expand the network while keeping the model performance on task t-1 based on equation 5. If the controller 505 decides to expand the network architecture, the newly added layer(s) will not have the previous tasks' Fisher Information. Accordingly, the system 500 considers the newly added layer as a new task specific layer, $l_t$. Regularization is adopted to promote sparsity in the new weight so that each neuron in the network architecture is only connected with few neurons in the layer below. This will efficiently learn the best (or an improved) representation for the new task while reducing the computation overhead. For example, the modified MWC in this network expanding scenario is as follows:

$$\min_{\theta^t} \mathcal{F}_i(\theta^t) + \frac{\lambda}{2} \sum_{\substack{i \neq deeper \\ i \neq wider}} \mathbb{F}_i(\theta_i^t - \bar{\theta}_i^{t-1})^2 + \quad \text{(Equation 8)}$$

$$\lambda_2 \|[\theta^t; \theta^{t-1}]\|_{2,1} + \lambda_3 \left\|\theta_{\substack{i=deeper \\ i=wider}}^t\right\|_1,$$

where the subscript deeper and wider refer to the newly added layer in task t.

After the controller 505 generates the child network architecture(s), the child network architecture(s) achieve an accuracy $A_{val}$ on the validation set of task t and this will be used as the reward signal $R^t$ to update the controller 505. The controller 505 maximizes (or increases) the expected reward to find the optimal, desired, or best child network architecture. For example, the empirical approximation of this AutoML reinforcement can be expressed as follows:

$$\frac{1}{m} \sum_{i=1}^{m} \sum_{s=1}^{S} \nabla_C \log P(a_s \mid a_1, \ldots, a_{s-1}; C) R_i^t, \quad \text{(Equation 9)}$$

where m is the number of child network architectures that the controller C samples in one batch and $\alpha_s$ and $g_s$ represents the action and state of predicting s-th hyperparameter to design a child network architecture, respectively. T is the transition function in Table 2 below. Since $R^t$ is non linear transformation tan $(A_{val} \times \pi/2)$ on validation set of task t, the transformed value is used as the reward. An exponential moving average of previous rewards with a decay of 0.95 is used to reduce the variance. To balance the old task and new task knowledge, for example, maximum expanding layers are set as 2 and 3 on the wider and deeper operators, respectively.

If the network keeps expanding as more and more tasks will be given, the model will suffer inefficiency and extra memory cost. Thus, the system 500 uses a model compression technique to reduce the memory cost and generate a non-expansive model. In one embodiment, the system 500 uses soft-labels (the logits) as knowledge distillation instead of the hard labels to train the model for the child network architectures. In one embodiment, the system 500 trains the model to minimize (or reduce) the mean of the $l_2$ loss on the training data $\{x_i^t, z_i^t\}_{i=1}^{N^t}$, where $z_i^t$ is the logits of the child network architecture $\theta^t$ i-th training sample. For example, the child network architecture $\theta^t$ can be compressed to the same size model as $\theta^1$ by knowledge distillation loss as follows:

$$\min_{\theta_c^t} \mathcal{F}_{kd}(f(x^t; \theta_c^t), z^t) = \frac{1}{N^t} \sum_i \|f(x_i^t; \theta_c^t) - z_i^t\|_2^2, \quad \text{(Equation 10)}$$

where $\theta_c^t$ is the weights of the child network architecture and $f(x_i^t; \theta_c^t)$ is the prediction of task i-th training sample. The final child network architecture $\theta_c^t$ is trained to convergence with hard and soft labels by the following loss function:

$$\min_{\theta_c^t} \mathcal{F}(f(x^t; \theta_c^t), y^t) + \mathcal{F}_{kd}(f(x^t; \theta_c^t), z^t), \quad \text{(Equation 11)}$$

where F is the loss function (cross-entropy in this work) for training with ground truth $y^t$ of task t.

Various embodiments of the present disclosure may be implemented by or for use with digital assistant devices and programs, for example, Bixby digital assistant by Samsung Electronics, Co. Digital assistant supporting computer vision programs are continuously updated to add new tasks, for example, for recognizing different types of items and places. Typically, the addition of each new task may require the deployment of a new deep learning model. Many different tasks being added overtime may require deployment of many models, potentially resulting in high storage and energy (e.g., battery) cost.

Embodiments of the present disclosure enable lifelong learning allowing continuous addition of such additional tasks for digital assistant (e.g., digital assistant device 116 in FIG. 1) while deploying one deep learning model. For example, in these embodiments, the system 500 identifies the initial/existing model for the initial/existing task(s). This model can be a compressed model or a non-compressed model. The system 500 then obtains the parameters from the existing model and adapts the existing model according to MWC (e.g., using equation 8 above) based AutoML (e.g., using Table 1: step 6 above) to expand the deep learning model to suit additional new task(s) beyond the initial/existing task(s). The system 500 then compresses the expanded network (e.g., using equation 11 above with Table 1: step 7 above).

In one embodiment, the compressed model will have a same or similar model size as the initial deep model. For example, it may not be advantageous to compress the model as small as possible, because a smaller model size may lead to accuracy loss. Instead, in this embodiment, the system 500 compresses the model little by little. For example, whenever a new task is added into the model, after expanding to accommodate the added task, the system 500 compresses the model into its original (or similar) model size. This compression and model size consistency is a trade-off between model complexity and model accuracy. The final deep model will have the same (or similar) model size as the initial model, but the final model can work on additional tasks as compared with the initial model. The system 500 can continually add new tasks, no matter the number and keep adapting the model as necessary whenever a new task is added.

In one embodiment, an initial version of computer vision for a digital assistant program is developed with a certain deep learning model for visual recognition, e.g., food recognition. The initial deployed deep learning model may be trained by developers or a third-party. If the initial model is pre-trained by a third-party, access to the training data may not be available-just the model itself. However, using model hyperparameters, the system 500 can adapt the model to perform new tasks without requiring access to the old tasks' training data. Additionally, for example, in mobile device applications where computation, storage, and battery constraints may be present, this initial model might have been compressed to the minimal size/capacity. Next, given the desire to add new visual recognition tasks/capabilities (e.g., particular item or place recognitions), there may be a few constraints in adding the new task. For example, in some embodiments, deploying multiple deep learning models, each corresponding to a different task, on the mobile device may be undesirable. Also, in various embodiments, the existing model should be adapted to perform multiple tasks. Further, in various embodiments, the adapted model's size should be increased as minimal as possible (e.g., by using Net2Net based AutoML as discussed above). Additionally, without training data for the old task, embodiments of the present disclosure can reduce or eliminate accuracy reduction on the old task by using MWC (e.g., by using equation 8 above). Further, in some embodiments, given that a trade-off exists between the model size and the model accuracy, the adapted output model remains the same or similar size as the initial model without forgetting the old task and also has the capacity to perform for multiple tasks.

In particular, for one embodiment, the system 500 can reuse the digital assistant's existing model to add new tasks/capabilities as follows. First, when a new task (e.g., wine recognition) is identified to be added, the system 500 prepares training and validation dataset/images for the new tasks (e.g., from a database or by internet image searches). The system 500 also obtains the previously trained model or model hyperparameters as the initial/existing model, for example, without access to old training database. Second, the system 500 uses one or more of the AutoML for Lifelong Learning with MWC techniques disclosed herein (e.g., Table 1: step 6) to adaptively train the existing deep learning model (e.g., a food recognition model) to perform the additional task. During the training, MWC (e.g., using equation 8) provides that even without training data for the old/existing task, the model can still maintain the existing accuracy/performance. The system 500 uses AutoML if, for example, the accuracy on the new task does not meet desired accuracy requirements/standards, for example, the model size/capacity may be too small to accommodate two tasks. The system 500 may then expand the deep learning model size, for example, according to the algorithm in Table 2. Third, when the accuracy requirement/standards are met and the model size has been increased significantly, the system 500 can compress the adapted model (e.g., using the compression according to equation 11 above and the algorithm in Table 1 and step 7). As a result, the computation, memory, and power cost on the adapted model is not greatly increased or is maintained.

Figure 7:
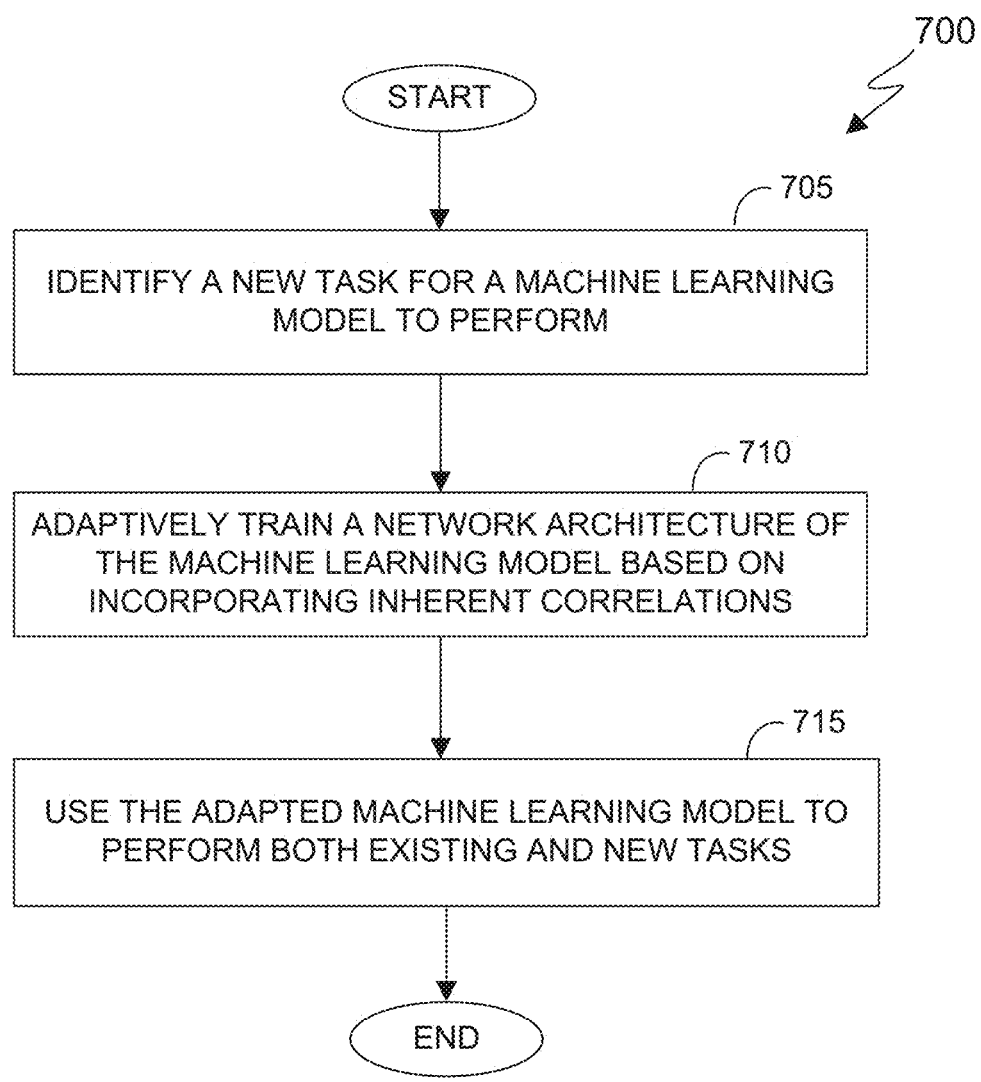
FIG. 7 illustrates a flowchart of a process for multi-task based lifelong learning in accordance with various embodiments of the present disclosure

FIG. 7 illustrates a flowchart of a process 700 for multi-task based lifelong learning in accordance with various embodiments of the present disclosure. For example, the process depicted in FIG. 11 may be performed by the electronic device 200 in FIG. 2, the electronic device 300 in FIG. 3, and the system 500 in FIG. 5, respectively, generally referred to here as the system.

The process begins with the system identifying a new task for a ML model to perform (step 705). For example, in step 705, the ML model may be trained to perform an existing task such as, for example, a computer vision task such as image classification or object detection tasks.

The system then adaptively trains a network architecture of the machine learning model to generate an adapted machine learning model based on incorporating inherent correlations between the new task and the existing task (step 710). For example, in various embodiments, in step 710, the system may generate and identify an adapted network architecture based on MWC as discussed above. In using MWC, the system may incorporate inherent correlations between the existing task and the new task and identify the added layer as a task-specific layer for the new task. Also, for example, the system may train the ML model to perform the new task using training data for the new task without access to the training data for the old task.

In some embodiments, to adapt the network architecture in step 710, the system may expand the network architecture for the ML model to perform the new task using AutoML, for example, by training child network architectures using wider and deeper operators as discussed with regard to FIG. 5 above. The expanded network architecture may include adding a layer to the network architecture and expanding one or more existing layers of the network architecture. After network expansion, the system may compress the expanded network architecture to generate the adapted ML model. For example, the system may remove and shrink layers from the selected best child network architecture to compress the child network architecture. To compress the expanded child network architecture, the system may use the training data for the new task to provide for accuracy in performing the task after compression. In some embodiments, the system may compress the generated child network architecture for the adapted ML model to have a reduced size or a same/similar size as the initial ML model to reduce memory constraints.

In some embodiments, to adapt the network architecture in step 710, the system may first adapt the network architecture using MWC as discussed above. Then, if the system determines that performance accuracy or standards cannot be maintained, for example, on either or both of the existing or new tasks, the system may then use AutoML as discussed above to expand the network architecture to achieve the desired performance accuracy or standards. Thereafter, the system may compress the network architecture to maintain model size.

The system then uses the adapted ML model to perform both existing and new tasks (step 715). Also, after step 715, the system may return to step 710 to continuously adapt the network architecture for additional new tasks for the lifelong learning for each new task identified.

Although FIG. 7 illustrates an example processes for multi-task based lifelong learning, various changes could be made to FIG. 7. For example, while shown as a series of steps, various steps in each figure could overlap, occur in parallel, occur in a different order, or occur multiple times.

Although the figures illustrate different examples of user equipment, various changes may be made to the figures. For example, the user equipment can include any number of each component in any suitable arrangement. In general, the figures do not limit the scope of the present disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for lifelong learning, the method comprising:
identifying a new task for a machine learning model to perform, the machine learning model trained to perform an existing task;
adaptively training a network architecture of the machine learning model to generate an adapted machine learning model based on incorporating inherent correlations between the new task and the existing task, wherein adaptively training the network architecture includes:
generating a plurality of child network architectures, wherein each of the plurality of child network architectures is expanded from a size of the network architecture by at least one of: adding one or more new layers to the network architecture or expanding one or more existing layers of the network architecture; and
determining an optimal child network architecture from the plurality of child network architectures for the adapted machine learning model; and
using the adapted machine learning model to perform both the existing task and the new task.

2. The method of claim 1, wherein, for each of the plurality of child network architectures, the size of the network architecture is expanded using AutoML.

3. The method of claim 2, wherein expanding the size of the network architecture using AutoML comprises at least one of:
using a deeper operator to add the one or more new layers to the network architecture; and
using a wider operator to expand the one or more existing layers of the network architecture.

4. The method of claim 1, further comprising:
identifying the one or more new layers as at least one task-specific layer for the new task.

5. The method of claim 1, further comprising:
compressing the optimal child network architecture to reduce a size of the optimal child network architecture;
wherein the size of the optimal child network architecture is not compressed smaller than the size of the network architecture.

6. The method of claim 1, wherein the machine learning model is a compressed model.

7. The method of claim 1, wherein adaptively training the network architecture further comprises:
training the machine learning model to perform the new task using training data for the new task; and
compressing the optimal child network architecture of the trained machine learning model using the training data for the new task.

8. An electronic device for lifelong learning, the electronic device comprising:
a memory configured to store a machine learning model trained to perform an existing task; and
a processor operably connected to the memory, the processor configured to:
identify a new task for the machine learning model to perform;
adaptively train a network architecture of the machine learning model to generate an adapted machine learning model based on incorporating inherent correlations between the new task and the existing task, wherein, to adaptively train the network architecture, the processor is configured to:
  generate a plurality of child network architectures, wherein each of the plurality of child network architectures is expanded from a size of the network architecture by at least one of: adding one or more new layers to the network architecture or expanding one or more existing layers of the network architecture; and
  determine an optimal child network architecture from the plurality of child network architectures for the adapted machine learning model; and
use the adapted machine learning model to perform both the existing task and the new task.

9. The electronic device of claim 8, wherein, for each of the plurality of child network architectures, the processor is configured to expand the size of the network architecture using AutoML.

10. The electronic device of claim 9, wherein, to expand the size of the network architecture using AutoML, the processor is configured to at least one of:
  use a deeper operator to add the one or more new layers to the network architecture; and
  use a wider operator to expand the one or more existing layers of the network architecture.

11. The electronic device of claim 8, wherein the processor is further configured to identify the one or more new layers as at least one task-specific layer for the new task.

12. The electronic device of claim 8, wherein:
  the processor is further configured to compress the optimal child network architecture to reduce a size of the optimal child network architecture; and
  the size of the optimal child network architecture is not compressed smaller than the size of the network architecture.

13. The electronic device of claim 8, wherein the machine learning model is a compressed model.

14. The electronic device of claim 8, wherein, to adaptively train the network architecture, the processor is further configured to:
  train the machine learning model to perform the new task using training data for the new task; and
  compress the optimal child network architecture of the trained machine learning model using the training data for the new task.

15. A non-transitory, computer-readable medium comprising program code for lifelong learning that, when executed by a processor of an electronic device, causes the electronic device to:
  identify a new task for a machine learning model to perform, the machine learning model trained to perform an existing task;
  adaptively train a network architecture of the machine learning model to generate an adapted machine learning model based on incorporating inherent correlations between the new task and the existing task; and
  use the adapted machine learning model to perform both the existing task and the new task;
  wherein the program code that, when executed by the processor, causes the electronic device to adaptively train the network architecture comprises program code that, when executed by the processor, causes the electronic device to:
    generate a plurality of child network architectures, wherein each of the plurality of child network architectures is expanded from a size of the network architecture by at least one of: adding one or more new layers to the network architecture or expanding one or more existing layers of the network architecture; and
    determine an optimal child network architecture from the plurality of child network architectures for the adapted machine learning model.

16. The non-transitory, computer-readable medium of claim 15, wherein the program code that, when executed by the processor, causes the electronic device to generate the plurality of child network architectures comprises program code that, when executed by the processor, causes the electronic device to, for each of the plurality of child network architectures, expand the size of the network architecture using AutoML.

17. The non-transitory, computer-readable medium of claim 16, wherein the program code that, when executed by the processor, causes the electronic device to expand the size of the network architecture using AutoML comprises program code that, when executed by the processor, causes the electronic device to at least one of:
  use a deeper operator to add the one or more new layers to the network architecture; and
  use a wider operator to expand the one or more existing layers of the network architecture.

18. The non-transitory, computer-readable medium of claim 15, further comprising program code that, when executed by the processor, causes the electronic device to identify the one or more new layers as at least one task-specific layer for the new task.

19. The non-transitory, computer-readable medium of claim 15, further comprising program code that, when executed by the processor, causes the electronic device to compress the optimal child network architecture of the machine learning model to reduce a size of the optimal child network architecture;
  wherein the size of the optimal child network architecture is not compressed smaller than the size of the network architecture.

20. The non-transitory, computer-readable medium of claim 15, wherein the program code that, when executed by the processor, causes the electronic device to adaptively train the network architecture further comprises program code that, when executed by the processor, causes the electronic device to:
  train the machine learning model to perform the new task using training data for the new task; and
  compress the optimal child network architecture of the trained machine learning model using the training data for the new task.

* * * * *